United States Patent
Birgel et al.

(10) Patent No.: US 9,811,696 B2
(45) Date of Patent: Nov. 7, 2017

(54) METHOD FOR OPERATING A FIELD DEVICE OF PROCESS AUTOMATION TECHNOLOGY

(71) Applicant: Endress + Hauser GmbH + Co. KG, Maulburg (DE)

(72) Inventors: Eric Birgel, Schopfheim (DE); Jorg Hahniche, Bad Krozingen (DE); Axel Poschmann, Basel (CH)

(73) Assignee: Endress + Hauser GmbH + Co. KG, Maulburg (DE)

( * ) Notice: Subject to any disclaimer, the term of this patent is extended or adjusted under 35 U.S.C. 154(b) by 78 days.

(21) Appl. No.: 14/366,412

(22) PCT Filed: Dec. 7, 2012

(86) PCT No.: PCT/EP2012/074747
§ 371 (c)(1),
(2) Date: Jun. 18, 2014

(87) PCT Pub. No.: WO2013/092246
PCT Pub. Date: Jun. 27, 2013

(65) Prior Publication Data
US 2014/0327522 A1 Nov. 6, 2014

(30) Foreign Application Priority Data
Dec. 21, 2011 (DE) .................. 10 2011 089 346

(51) Int. Cl.
*G06K 7/10* (2006.01)
*H04B 5/00* (2006.01)
*G06K 19/07* (2006.01)

(52) U.S. Cl.
CPC ..... *G06K 7/10297* (2013.01); *G06K 19/0716* (2013.01); *H04B 5/0037* (2013.01)

(58) Field of Classification Search
None
See application file for complete search history.

(56) References Cited

U.S. PATENT DOCUMENTS

| 8,179,266 B2 | 5/2012 | Hermle |
| 2006/0254911 A1 | 11/2006 | Lindmueller et al. |

(Continued)

FOREIGN PATENT DOCUMENTS

| CN | 201955802 U | 8/2011 |
| DE | 10313639 A1 | 10/2004 |

(Continued)

OTHER PUBLICATIONS

English translation of International Preliminary Report on Patentability, WIPO, Geneva, Jul. 3 2014.

(Continued)

*Primary Examiner* — Daniell L Negron
(74) *Attorney, Agent, or Firm* — Bacon & Thomas, PLLC

(57) ABSTRACT

Method for operating a field device of process automation technology, wherein the field device includes a main circuit, which serves in a first operating mode for evaluation and for output of process data, which preferably come from a measuring transducer, wherein the field device includes a first interface, which serves in the first operating mode to supply the field device, especially the main circuit, with electrical energy, wherein the field device includes a second, preferably wireless, interface, which serves for transmission of data and/or electrical energy to the field device, wherein the field device, preferably the main circuit, is supplied in a second operating mode with electrical energy, preferably exclusively with electrical energy, obtained via the second interface.

12 Claims, 1 Drawing Sheet

(56) References Cited

U.S. PATENT DOCUMENTS

2007/0118334 A1      5/2007  Guenter
2007/0252702 A1     11/2007  Wulff
2009/0189738 A1      7/2009  Hermle
2013/0173736 A1*     7/2013  Krzeminski .......... H04W 12/10
                                                           709/213

FOREIGN PATENT DOCUMENTS

DE      102006011501 A1     9/2007
DE      102008008072 A1     7/2009

OTHER PUBLICATIONS

German Search Report, German PTO, Munich, dated Sep. 24, 2012.
International Search Report, EPO, The Netherlands, dated Apr. 24, 2013.

* cited by examiner

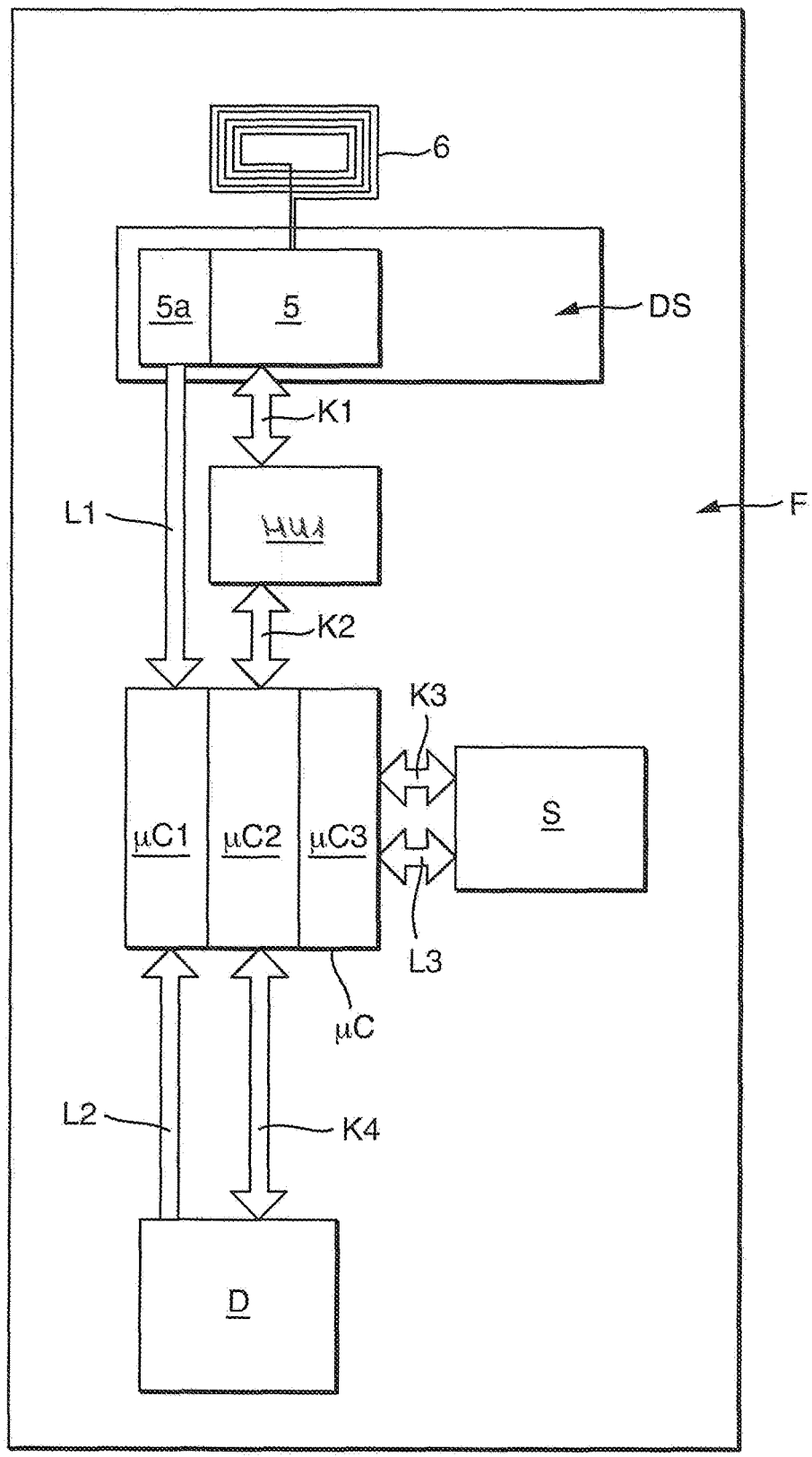

METHOD FOR OPERATING A FIELD DEVICE OF PROCESS AUTOMATION TECHNOLOGY

TECHNICAL FIELD

The invention relates to a method for operating a field device of process automation technology. Furthermore, the invention relates to a field device of process automation technology.

BACKGROUND DISCUSSION

Known from the state of the art are field devices, which serve for use in industrial plants. Such field devices have an often robust housing, in order to brave the environmental conditions of such applications.

Known from the state of the art is to provide the housing of a field device with an (Radio Frequency Identification) RFID data carrier, so that information stored in the RFID data carrier is contactlessly queryable. Furthermore, it is known from German Patent, DE 102008008072 A1 to connect these RFID data carriers with an internal electronics unit of the sensor, so that signals of the RFID data carrier can be provided internally to the sensor. To this end, the RFID-data carrier can be writable.

Furthermore, German Patent, DE 202006012632 U1 describes the application of RFID transponders for access control to a machine.

For wireless data transmission, moreover, different standards have been created. Thus, for example, an inductive coupling or near field coupling (NFC) (Near Field Communication) can occur via magnetic fields. Data transmission and often also energy supply occur, in such case, via a magnetic near field, which is mediated by coils in a reading device and in a so-called tag. The frequencies used in such transmission lie at 135 kHz, 13.56 MHz and are specified by the standards, ISO 18000-2 and ISO 18000-3, respectively ISO 22536 and ISO/IEC 15693. Furthermore, it is known to utilize electromagnetic dipole fields for remote coupling. In such case, the data transmission and often also the energy supply occurs via antennas, for example, dipole antennas or spiral antennas. The frequencies at which this coupling occurs lie at 433 MHz, 868 MHz and 2.45 GHz, which are specified by the standards, ISO 18000-7, ISO18000-6, respectively ISO 18000-4.

Conventional NFC communication in the peer to peer mode offers, however, the disadvantage that it is too power intensive for continuous bidirectional data transmission, such as occurs, for example, in the case of parametering a field device of process and/or automation technology via a software tool for field device configuration.

Furthermore, additionally known from the state of the art are fieldbusses and fieldbus systems as well as field devices for use in such fieldbusses. The field devices are supplied for this purpose with electrical energy via the fieldbus or via a separate energy source.

In such case, it is, on the one hand, disadvantageous that the power is limited via the fieldbus or in the field device, so that, for example, such as explained above, a continuous data transmission via a secondary interface is not possible. On the other hand, data cannot be exchanged with the field device, when its energy supply is interrupted.

SUMMARY OF THE INVENTION

An object of the invention is to provide a basic functioning of the field device, even when the energy supply of the field device, for example, via the fieldbus, is interrupted.

Such object is achieved by a method and by a field device. As regards the method, the object is achieved by a method for operating a field device of process automation technology, wherein the field device includes a main circuit, which serves in a first operating mode for evaluation and for output of process data, which preferably come from a measuring transducer, wherein the field device includes a first interface, which serves in the first operating mode to supply the field device, especially the main circuit, with electrical energy, wherein the field device includes a second, preferably wireless, interface, which serves for transmission of data and/or electrical energy to the field device, wherein the field device, preferably the main circuit, is supplied in a second operating mode with electrical energy, preferably exclusively with electrical energy, obtained via the second interface.

In a form of embodiment of the method, the first interface is a fieldbus interface.

In an additional form of embodiment of the method, the second interface is a transponder, preferably a transponder according to the NFC- and/or the RFID standard.

In an additional form of embodiment of the method, the field device includes a measuring transducer, wherein in the first operating mode both the measuring transducer as well as also the main circuit are supplied with electrical energy, preferably exclusively with electrical energy, obtained via the first interface.

In an additional form of embodiment of the method, the main circuit includes a microprocessor and a memory unit.

In an additional form of embodiment of the method, data are written into the memory unit by means of the microprocessor.

In an additional form of embodiment of the method, in the first and/or in the second operating mode, data are written into the memory unit, preferably directly into the memory unit, and/or data are read-out from the memory unit, especially preferably directly from the memory unit, via the second interface.

In an additional form of embodiment of the method, in the second operating mode, the microprocessor and the memory unit are supplied with electrical energy obtained via the second interface.

In an additional form of embodiment of the method, in the second operating mode, data are written into the memory unit via the second interface.

In an additional form of embodiment of the method, in the second operating mode, data written into the memory unit are read-out by the microprocessor and preferably stored in an internal memory of the microprocessor.

In an additional form of embodiment of the method, the second interface includes an auxiliary circuit, which serves for preprocessing of data received via the second interface, and the auxiliary circuit is connected respectively with the microprocessor of the main circuit and with the memory unit of the main circuit.

In an additional form of embodiment of the method, in the second operating mode, electrical energy is transmitted via the connection to the main circuit from the auxiliary circuit to the main circuit.

In an additional form of embodiment of the method, in the second operating mode, data are transmitted via the connection to the memory unit from the auxiliary circuit to the memory unit, wherein the data are preferably field device parameters.

In an additional form of embodiment of the method, in the second operating mode, only the main circuit is supplied with electrical energy.

In an additional form of embodiment of the method, the main circuit is galvanically isolated from the second interface, especially from the auxiliary circuit.

In an additional form of embodiment of the method, a change of the parameters of the field device in the first operating mode is secured in the memory unit, which is preferably a non-volatile memory unit.

As regards the field device, the object is achieved by a field device of process automation technology comprising a main circuit, which serves in a first operating mode for evaluation and for output of process data, and first and second interfaces for performing the method according to one of the preceding forms of embodiment.

BRIEF DESCRIPTION OF THE DRAWINGS

The invention will now be explained in greater detail based on the appended drawing, the sole FIGURE of which shows as follows:

FIG. 1 is a schematic representation of a form of embodiment of the invention.

DETAILED DISCUSSION IN CONJUNCTION WITH THE DRAWINGS

FIG. 1 shows a schematic representation of a field device F. The field device according to FIG. 1 is, can be, connected to a fieldbus (not shown), via which it is supplied with electrical energy and via which data can be exchanged with other field devices and/or with a process control unit. Alternatively, the field device F can be connected, not with a fieldbus, but, instead, supplied with electrical energy via another internal or external energy source.

The field device F includes a sensor S, which is connected with a microprocessor μC. This microprocessor μC serves to assure, to execute and to manage the functions and functionalities of the field device F. To this end, a measurement signal or a signal derived therefrom is transmitted via the communication connection K3 from the sensor S to the microprocessor μC. The microprocessor μC further processes, respectively evaluates, the measurement signal or the signal derived therefrom and outputs such as measurement data via the communication connection K4 to a display or via the fieldbus (not shown). In general, the display or the fieldbus interface is, can be, a first interface D of the field device F, to which other units are connectable, wherein the energy supply of the field device F occurs via this first interface D by means of an external energy supply or a fieldbus. This is indicated in FIG. 1 by the connecting line L2. Via connecting line L2, the microprocessor μC is supplied with electrical energy. The microprocessor μC serves preferably in the first operating mode also to forward this provided electrical energy, for example, via the connecting line L3, to the sensor S, so that the sensor S is supplied with electrical energy, in order to transduce a measured variable into a measurement signal or a signal derived therefrom. The microprocessor μC serves thus for control or managing of the electrical energy for the sensor S and/or other components of the field device F.

The microprocessor μC also writes field device parameters or other relevant data via a communication connection K2 into a memory unit MU1. Microprocessor μC and memory unit MU1 form, in such case, a main circuit. This data can then be downloaded from the memory unit MU1 and used for evaluation and/or further processing, for example, of the measurement signal or a signal derived therefrom coming from the sensor S preferably during the first operating mode. The microprocessor μC and the memory unit MU1, as well as the sensor S, are, consequently, supplied in a first operating mode, with electrical energy via a first interface D of the field device F.

Both the microprocessor μC as well as also the memory unit MU1 are additionally connected with a second interface DS, which is, according to the example of an embodiment in FIG. 1, a wireless interface. Interface DS includes an antenna 6, which serves for wireless communication with at least one other communication participant (not shown). Furthermore, besides data also energy can be transmitted, for example, via electromagnetic induction, to the field device F, more exactly, to the second interface DS, via this wireless interface DS, i.e. interface for wireless communication. This electrical energy can then be used for operating a preprocessor 5. Furthermore, interface DS includes a power distribution unit 5a, which controls the distribution of the electrical energy obtained via the second interface DS. The power distribution unit 5a can, for example, in a second operating mode, transmit electrical energy via the first connecting line L1 to the microprocessor μC, respectively only to first and second parts μC1, μC2 of the microprocessor, respectively only into the periphery of the microprocessor μC. This electrical energy serves for performance of certain functions μC1, μC2, respectively functionalities μC1, μC2, provided in the second operating mode. Among other things, in the second operating mode, the microprocessor μC can be supplied with electrical energy, so that the microprocessor μC can exchange data via the communication connection K2 with the memory unit MU1, respectively write data into the memory unit MU1 or read out data from the memory unit MU1. This data or only a part of the data read-out from the memory unit MU1 can be written by the microprocessor μC, for example, into an internal memory (not shown).

Moreover, by means of the second interface DS in the first and/or second operating mode, via the first communication connection K1, data can be written into the memory MU1 or read-out from the memory MU1 and transmitted via the second interface DS to a servicing device, for example, for additional evaluation. Utilized for communication via the second interface DS can be, for example, the above-mentioned ISO/IEC 15693 standard.

Additionally, both in the first as well as also in the second operating mode, or in another operating mode, parameters can be written from the servicing device into the memory MU1. Preferably, the parameters are transmitted offline, i.e. when the field device F is not supplied with electrical energy via the first interface, to the field device F and written into the memory unit MU1. The field device F can then read these data out from the memory unit MU1 after the field device F is again supplied with electrical energy via the first interface D and begin and/or continue the operation with these parameters.

For example, the aforementioned method can be applied, in order to replace one field device with another in the case of a defect or an upgrade. Thus, for example, the parameters present in the old field device can be read-out from the memory MU1 and transmitted to the new field device into its memory MU1. To this end, it can be advantageous, when all changes of parameters of a field device are held permanently in the memory unit MU1.

LIST OF REFERENCE CHARACTERS

μC microprocessor
μC1 first functionalities of the microprocessor

μC2 second functionalities of the microprocessor
μC3 third functionalities of the microprocessor
L1 first connecting line for transmission of electrical energy
L2 second connecting line
L3 third connecting line
K1 first communication connection
K2 second communication connection
K3 third communication connection
K4 fourth communication connection
S sensor
D first interface, for example, a display
DS second interface, for example, a wireless interface
MU1 memory unit
5 preprocessor
5a power distribution unit
6 antenna for wireless communication
F field device

The invention claimed is:

1. A method for operating a field device of process automation technology, which includes a main circuit, including a microprocessor and a memory unit, a first interface and a wireless second interface which serves for transmission of data and electrical energy to the field device, comprising the steps of:
    evaluating and outputting of process data by the main circuit in a first operating mode and supplying the field device with electrical energy via the first interface in the first operating mode;
    supplying the field device in a second operating mode exclusively with electrical energy obtained via said wireless second interface;
    supplying the microprocessor and the memory unit with electrical energy via the wireless second interface in the second operating mode
    in the second operating mode, data are written into the memory unit via the second interface;
    in the second operating mode, data written into the memory unit of the microprocessor are read-out and stored in an internal memory of the microprocessor; and
    the second interface includes an auxiliary circuit, which serves for preprocessing the data received via the second interface, and the auxiliary circuit is connected respectively with the microprocessor of the main circuit and with the memory unit of the main circuit.

2. The method as claimed in claim 1, wherein:
the first interface is a fieldbus interface.

3. The method as claimed in claim 2, wherein:
the second interface is a transponder according to the NFC- and/or the RFID standard.

4. The method as claimed in claim 3, wherein:
the field device includes a measuring transducer; and
in the first operating mode both the measuring transducer as well as also the main circuit are supplied exclusively with electrical energy obtained via the first interface.

5. The method as claimed in claim 1, wherein:
data are written into the memory unit by means of the microprocessor.

6. The method as claimed in claim 5, wherein:
in the first and/or in the second operating mode, data are written into the memory unit, and/or data are read-out from the memory unit, via the second interface.

7. The method as claimed in claim 1, wherein:
in the second operating mode, electrical energy is transmitted via the connection to the main circuit from the auxiliary circuit to the main circuit.

8. The method as claimed in claim 7, wherein:
in the second operating mode, data are transmitted via the connection to the memory unit from the auxiliary circuit to the memory unit;
the data are field device parameters.

9. The method as claimed in claim 8, wherein:
in the second operating mode, only the main circuit is supplied with electrical energy.

10. The method as claimed in claim 9, wherein:
the main circuit is galvanically isolated from the second interface.

11. The method as claimed in claim 10, wherein:
a change of the parameters of the field device in the first operating mode is secured in the memory unit.

12. A field device of process automation technology comprising:
    a main circuit, which serves in a first operating mode for evaluation and for output of process data, said main circuit including a microprocessor and a memory unit;
    a first interface for supplying the field device with electrical energy in the first operating mode; and
    a wireless second interface for transmitting data and/or electrical energy to the field device, wherein the field device is supplied in a second operating mode exclusively with electrical energy obtained via the second interface, wherein:
    in the second operating mode, said microprocessor and said memory unit are supplied with electrical energy obtained via said wireless second interfaces;
    in the second operating mode, data are written into the memory unit via the second interface;
    in the second operating mode, data written into the memory unit of the microprocessor are read-out and stored in an internal memory of the microprocessor; and
    the second interface includes an auxiliary circuit, which serves for preprocessing the data received via the second interface, and the auxiliary circuit is connected respectively with the microprocessor of the main circuit and with the memory unit of the main circuit.

* * * * *